United States Patent [19]

Wu et al.

[11] 4,215,068

[45] Jul. 29, 1980

[54] PREPARATION OF 1,3-DICYANOCYCLOPENTANE

[75] Inventors: Ching-Yong Wu, O'Hara Township, Allegheny County; Harold E. Swift, Gibsonia, both of Pa.

[73] Assignee: Gulf Research & Development Company, Pittsburgh, Pa.

[21] Appl. No.: 26,005

[22] Filed: Apr. 2, 1979

Related U.S. Application Data

[63] Continuation-in-part of Ser. No. 854,665, Nov. 25, 1977, abandoned.

[51] Int. Cl.$^2$ ............... C07C 120/02; C07C 121/46
[52] U.S. Cl. ................... 260/464; 260/453 A; 260/563 R; 528/85; 528/272; 528/309; 528/346; 562/509; 568/838
[58] Field of Search .......................................... 260/464

[56] References Cited

U.S. PATENT DOCUMENTS

| | | | |
|---|---|---|---|
| 2,394,597 | 2/1946 | Dickey et al. | 260/453 A |
| 2,502,412 | 4/1950 | Ardis | 260/465.2 X |
| 3,198,769 | 8/1965 | Macon | 528/307 |
| 3,232,973 | 2/1966 | Bayer et al. | 260/453 A |
| 3,496,217 | 2/1970 | Drinkard, Jr. et al. | 260/464 X |
| 3,663,589 | 5/1972 | Leucke | 260/465.2 X |
| 3,686,260 | 8/1972 | Inoue et al. | 260/464 |
| 3,734,942 | 5/1973 | Dennis | 260/465.2 X |
| 3,752,839 | 8/1973 | Drinkard, Jr. et al. | 260/464 X |
| 3,778,462 | 12/1973 | Taylor et al. | 260/464 X |
| 3,850,973 | 11/1974 | Seidel et al. | 260/464 |

OTHER PUBLICATIONS

Aspinall et al., C.A.; 44, (1950), 6848b.
Aspinall et al., J. Chem. Soc. (1950), pp. 743-747.
Cotton et al., "Advanced Inorganic Chemistry", Interscience Publishers, pp. 602-607, (1966).
C.A., 66 (1967), Fremery et al., 28397w.
C.A. 69 (1968), Berger et al., 2543c.
C.A. 8th Coll. Subject Index, 1967-1971, p. 9274s. (1972).
Houben Weyl, (1952), Band VIII, Methoden Der Organischen Chemie, Sauerstoffenerbindungen III, pp. 290-291.
Fuchs et al., J. Chem. Soc., Perkins trans, 2 (1977), (1), pp. 75-80.
Zabicky,"The Chemistry of Amides, " (1970), p. 108, Interscience Pub.
Degering, "An Outline of Organic Nitrogen Compounds, " (1945), p. 504, University Lithoprinters.
C.A., 65, (1966), du Pont, 829b.
C.A., 65, (1966), Schering, 829d.

*Primary Examiner*—Joseph P. Brust

[57] ABSTRACT

1,3-Dicyanocyclopentane is prepared by the hydrocyanation of 2-cyanocyclopentene in the presence of a catalyst system comprising a zero valent nickel complex, free of carbon monoxide, and a promoting amount of a metal compound such as zinc chloride.

9 Claims, No Drawings

PREPARATION OF 1,3-DICYANOCYCLOPENTANE

This patent application is a continuation-in-part of Ser. No. 854,665, filed Nov. 25, 1977, now abandoned.

FIELD OF THE INVENTION

This invention relates to the hydrocyanation of 2-cyanocyclopentene using a promoted nickel complex catalyst.

DESCRIPTION OF THE PRIOR ART

U.S. Pat. Nos. 3,496,217 and 3,778,462 describe the addition of hydrogen cyanide to nonactivated aliphatic double bonds in the presence of a zero valent nickel complex free of carbon monoxide and a promoter such as zinc chloride with or without a solvent.

SUMMARY OF THE INVENTION

In attempting to dihydrocyanate cyclopentadiene to produce 1,3-dicyanocyclopentane using the active catalyst described in U.S. Pat. Nos. 3,496,217 and 3,778,462, we have discovered that the cyclopentadiene undesirably homopolymerizes. When an unpromoted catalyst was used, we found that the cyclopentadiene could be monohydrocyanated but that the product distribution was unfavorable, comprising 82 percent of the 2-cyanocyclopentene isomer. It was evident that further hydrocyanation of the 2-cyanocyclopentene using a second hydrocyanation procedure should result in an equimolar mixture of 1,2-dicyanocyclopentane and 1,3-dicyanocyclopentane, which would make this procedure unsuitable for producing 1,3-dicyanocyclopentane. However, when we hydrocyanated the 2-cyanocyclopentene in the presence of a catalyst system comprising a zero valent nickel complex and a promoter such as zinc chloride, we surprisingly discovered that 1,3-dicyanocyclopentane was produced as the predominant product. For example, a feed composition comprising 82 parts of 2-cyanocyclopentene and 16 parts of 3-cyanocyclopentene was converted to a product comprising 15.1 parts of 1,2-dicyanocyclopentane and 50.6 parts of 1,3-dicyanocyclopentane, with a substantial portion of the two cyanocyclopentenes being unreacted.

Cyclopentadiene is readily available as a co-product from the pyrolysis of liquid hydrocarbons to make ethylene. The 1,3-dicyanocyclopentane can be converted to 1,3-cyclopentanedimethanol or 1,3-cyclopentanedicarboxylic acid and this reacted with a polyacid or polyol, respectively, to form a polyester resin. The 1,3-dicyanocyclopentane can also be readily hydrogenated to 1,3-bis(aminomethyl)cyclopentane and this reacted with an aromatic or aliphatic diacid, such as terephthalic acid, adipic acid or 1,3-cyclopentanedicarboxylic acid, to form a polyamide resin. Or the 1,3-bis-(aminomethyl)cyclopentane can be converted to 1,3-di(isocyanatomethyl)cyclopentane by phosgenation for reaction with a suitable polyhydroxy compound such as a poly(oxypropylene)glycol in the preparation of the urethan polymer.

The zero valent nickel complex which is useful in hydrocyanating 2-cyanocyclopentene has the general formula $Ni(A^1)(A^2)(A^3)(A^4)$ where $A^1$, $A^2$, $A^3$, and $A^4$ are neutral ligands which may be the same or different and have the formula $P(X)(Y)(Z)$ wherein X and Y are selected from the class consisting of R and OR, and Z has the formula OR, wherein the three R's may be the same or different, and wherein R is selected from the class consisting of alkyl and aryl groups containing up to 18 carbon atoms with aryl being preferred. An especially preferred class of R's are phenyl and chloro, methyl and methoxy substituted phenyl.

If desired, any of the R's may be cojoined where possible. Thus the preferred neutral ligands of this group are the aryl phosphites such as triphenyl phosphite, tri(m- and p-chlorophenyl)phosphite, tri(m- and p-methoxyphenyl)phosphite and tri(m- and p-cresyl)phosphite and mixtures thereof. Under many of the reaction conditions one or more $A^1$, $A^2$, $A^3$, or $A^4$ may become disassociated from the nickel.

The ligands useful in forming the catalyst here may be defined as any atoms or molecules capable of functioning as a sigma-pi bonded partner in one or more coordinate bonds. A description of such ligands may be found in Advanced Inorganic Chemistry by F. Albert Cotton and G. Wilkinson, (1966) published by Interscience Publishers, a division of John Wiley & Sons, Library of Congress Catalog Card No. 62-14818; particularly on pages 602–606.

In many instances, it is advantageous to have an excess of certain neutral ligands present with respect to the nickel complex. The preferred excess ligands are the aryl phosphites wherein the aryl groups contain up to 18 carbon atoms. Generally, the excess ligand is present in at least a two molar excess as based on the nickel present. The only limit of excess ligand involves practical considerations for it may even be used as the solvent. However, generally there is little advantage to be obtained in using over a 300 mol excess of ligand as based on one mol of nickel. The preferred triaryl phosphites for use as excess ligand are triphenyl phosphite, tri(m- and p-tolyl)phosphites, tri(m- and p-methoxyphenyl)phosphites and tri(m- and p-cresyl)phosphites, and mixtures thereof. The primary benefit obtained by the use of the excess ligand is to extend the life of the catalyst. Suitable techniques for preparing these nickel complexes are disclosed in U.S. Pat. No. 3,778,462. In the hydrocyanation reaction the mol ratio of the cyanocyclopentene charge stock to the nickel catalyst is preferably within the range of about 10:1 to about 2,000:1.

A promoter for the nickel complex catalyst of this invention is also employed, said promoter being a compound containing a cation of a metal selected from the class consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt, or mixtures thereof. Preferably, the compound should be at least partially soluble in the system, and also, preferably, should not have an oxidizing tendency since this generally results in at least partial loss of the nickel catalyst.

The anion portion of the compound is preferably selected from the class consisting of halide, i.e., fluoride, chloride, bromide, and iodide, anions of lower fatty acids of from 2 to 7 carbon atoms, $HPO_3^{-2}$, $H_2PO_2^-$, $CF_3COO^-$, $OSO_2C_7F_{15}^-$, $SO_4^{-2}$, etc. Useful organometallic compounds include $(C_2H_5)_3Al_2Cl_3$ and $C_2H_5AlCl_2$. The promoter acts to improve the number of cycles and in certain cases, the yield and rate. The amount of promoter used generally can be varied from about 1:16 to 50:1 molar ratio of promoter to catalyst. The promoter may be used according to several techniques. Thus, while at least some of the promoter may be added to the reaction mixture at the start of the reaction, additional amounts may be added at any point in time during the reaction.

Since the cyanocyclopentene is a liquid at reaction conditions, a solvent is not needed, that is, excess cyanocyclopentene can serve as the solvent. In fact, we prefer the use of excess reactant liquid as the solvent. However, other solvent materials can be used including aryl compounds having from six to 20, preferably from six to ten carbon atoms and at least one hydroxyl group and optionally one or more substituents selected from fluorine, chlorine, bromine, iodine, nitro, cyano and hydrocarbon having from one to six carbon atoms, such as phenol, p-cresol, resorcinol, beta-naphthol, p-chlorophenol, p-nitrophenol, p-butylphenol, and the like. Other solvents can be used including aromatic hydrocarbons such as benzene, toluene, xylene, ethylbenzene; nitriles such as acetonitrile and benzonitrile; ethers such as dioxane, o-dimethoxybenzene, tetrahydrofuran and dimethoxyethane; chloroaromatic compounds such as o-dichlorobenzene, and the like. The solvent can be used in an amount to provide a solvent to cyanocyclopentene weight ratio up to about 20:1, preferably up to about 10:1.

The hydrocyanation reaction proceeds under well known hydrocyanation conditions. The temperature is not critical and the particular temperature chosen may depend to some extent on the particular catalyst employed, considering, of course, the desired rate of reaction. Generally, temperatures from $-25°$ C. to $200°$ C. can satisfactorily be employed, with temperatures from $0°$ to $150°$ C. being preferred. Reaction pressure is likewise not critical, and atmospheric pressure is suitable. Lower or higher pressures can also be employed, such as from 0.05 to 100 atmospheres, although these higher pressures serve no particular purpose.

DESCRIPTION OF PREFERRED EMBODIMENTS

In the following examples the hydrogen cyanide was fed to the reactor by bubbling a continuous stream of nitrogen gas containing vaporized hydrogen cyanide through the reaction liquid during the course of the reaction. Catalyst removal was effected by permitting the catalyst to precipitate out of the product liquid on standing and filtering off the precipitate. Analysis for 1-cyanocyclopentene was by gas chromatograph. Since 2-cyanocyclopentene and 3-cyanocyclopentene are very difficult to separate by chromatography, analysis for these individual compounds was by carbon 13 NMR spectroscopy. Analysis for 1,2-dicyanocyclopentane and 1,3-dicyanocyclopentane, jointly, was by gas chromatograph, while the individual compounds were determined by carbon NMR spectroscopy. The 1,3-dicyanocyclopentane is separated from the product mixture by fractional distillation for use.

EXAMPLE 1

A 38 cc. charge of cyclopentadiene and 150 cc. of toluene were placed in a 300 cc. glass reactor with a magnetic stirrer. A catalyst consisting of three mmols of tetrakis(tri-p-tolylphosphite)nickel and 15 mmols of tri-p-tolylphosphite was introduced into the reactor. The contents of the reactor were heated to 60° C. and hydrogen cyanide was bubbled through the reaction liquid at atmospheric pressure at a rate of 50 mmols per hour. After six hours, the experiment was terminated. Analysis of the contents of the reactor disclosed the production of 179 mmols of cyanocyclopentenes and 34 mmols of cyanodicyclopentenes. The cyanocyclopentene was separated out by fractionation and was further analyzed for 1-cyanocyclopentene by chromatograph and for 2-cyanocyclopentene and 3-cyanocyclopentene by NMR spectroscopy. This analysis disclosed that the cyanocyclopentene fraction contained two percent 1-cyanocyclopentene, 82 percent 2-cyanocyclopentene and 16 percent 3-cyanocyclopentene. This general experiment was repeated many times using different proportions of catalyst, cyclopentadiene and solvent and the same proportions of the cyanocyclopentenes were produced in each instance.

EXAMPLE 2

A 30 cc. portion of the cyanocyclopentene mixture as prepared in Example 1 was placed in the glass reactor and one mmol of tetrakis(tri-p-tolylphosphite)nickel and one mmol of zinc chloride were added. The reactor was maintained at 60° C. while 6.17 g. of hydrogen cyanide were added over a nine-hour period of time. The reaction product analyzed 12.7 weight percent (15.8 mol percent) 1-cyanocyclopentene, 20.1 weight percent (19.4 mol percent) 1,2-dicyanocyclopentane and 67.2 weight percent (64.8 mol percent) 1,3-dicyanocyclopentane. The conversion of the cyanocyclopentene feed mixture was 58.5 percent. The mol ratio of 1,3-dicyanocyclopentane to 1,2-dicyanocyclopentane in the product was 3.34 compared with a mol ratio of 3-cyanocyclopentene to 2-cyanocyclopentene in the feed of 0.195.

EXAMPLE 3

A 15 cc. (0.122 mol) portion of the cyanocyclopentene mixture as produced in Example 1 and 15 cc. of p-cresol were placed in the reactor. To this solution was introduced one mmol of tetrakis(tri-p-tolylphosphite)-nickel and one mmol of zinc chloride. The reactor was heated at 60° C. for six hours as 2.67 g. of hydrogen cyanide were added. There was 78.4 percent conversion of the feed to a product analyzing 18.4 mol percent 1-cyanocyclopentene, 18.4 mol percent 1,2-dicyanocyclopentane and 63.2 mol percent 1,3-dicyanocyclopentane. This represents a mol ratio of the 1,3-dicyanocyclopentane to 1,2-dicyanocyclopentane of 3.44.

EXAMPLE 4

The procedures and conditions of Example 3 were repeated except that the amount of zinc chloride that was used was doubled to two mmols and 2.786 g. (0.1032 mol) of hydrogen cyanide were added in six hours. There was 74.8 percent conversion of the feed mixture to a product consisting of 19.0 mol percent 1-cyanocyclopentene and 81.0 mol percent of a mixture of 1,2-dicyanocyclopentane and 1,3-dicyanocyclopentane.

EXAMPLE 5

Another experiment was carried out identical to Example 4 except that the reaction time was seven hours and a total of 3.32 g. (0.1185 mol) of hydrogen cyanide were added. There was 87.5 percent conversion of the feed mixture to a product analyzing 27 mol percent 1-cyanocyclopentene and 73 mol percent of a mixture of 1,2-dicyanocyclopentane and 1,3-dicyanocyclopentane.

EXAMPLE 6

The products of Examples 4 and 5 were combined and after catalyst removal, the mixture was distilled. A center cut containing only 1,2-dicyanocyclopentane and 1,3-dicyanocyclopentane was obtained at 100° C. and 1 mm. of mercury. Analysis of this fraction by carbon 13 NMR spectroscopy disclosed that it contained 76.6 mol percent 1,3-dicyanocyclopentane and 23.4 mol percent 1,2-dicyanocyclopentane. This represents a mol ratio of the 1,3-dicyanocyclopentane to 1,2-dicyanocyclopentane of 3.27.

EXAMPLE 7

The procedures and conditions of Example 3 were repeated except that 14 cc. of the product mixture as prepared in Example 1, 15 cc. of o-dichlorobenzene and 2.43 g. of hydrogen cyanide were used. The product analyzed 29.1 mol percent 1-cyanocyclopentene, 18.0 mol percent 1,2-dicyanocyclopentane and 54.3 mol percent 1,3-dicyanocyclopentane at a conversion of 58.7 percent of the feed mixture. The mol ratio of 1,3-dicyanocyclopentane to 1,2-dicyanocyclopentane was 3.02.

EXAMPLE 8

The procedures and conditions of Example 3 were repeated except that the solvent was 15 cc. of acetonitrile and 2.55 g. of hydrogen cyanide were used. After six hours of reaction at 60° C. the conversion of the feed mixture was 17.3 percent. The product analyzed 32.5 mol percent 1-cyanocyclopentene, 17.2 mol percent 1,2-dicyanocyclopentane and 51.7 mol percent 1,3-dicyanocyclopentane. The ratio of 1,3-dicyanocyclopentane to 1,2-dicyanocyclopentane was 3.00.

It is to be understood that the above disclosure is by way of specific example and that numerous modifications and variations are available to those of ordinary skill in the art without departing from the true spirit and scope of the invention.

We claim:

1. A method of hydrocyanating 2-cyanocyclopentene to a product mixture predominant in 1,3-dicyanocyclopentane which comprises contacting a composition comprising 2-cyanocyclopentene with hydrogen cyanide at a temperature from about −25° C. to about 200° C. in the presence of
    (a) a zero valent nickel complex, free of CO, having the formula $Ni(A^1)(A^2)(A^3)(A^4)$ where $A^1$, $A^2$, $A^3$ and $A^4$ are neutral ligands which may be the same or different and have the formula P (X) (Y) (Z) wherein X and Y are selected from the class consisting of R and OR, and Z has the formula OR, wherein the three R's may be the same or different and wherein R is selected from the class consisting of alkyl and aryl groups containing up to 18 carbon atoms; and
    (b) a promoting amount of a compound containing a metal selected from the group consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt; wherein
    (1) the molar ratio of said promoter to the nickel complex is from about 1:16 to 50:1; and
    (2) the molar ratio of the composition comprising 2-cyanocyclopentene to the nickel complex is from about 10:1 to 2,000:1.

2. A method of hydrocyanating 2-cyanocyclopentene in accordance with claim 1 in which said composition comprises at least about 50 mol percent 2-cyanocyclopentene.

3. A method in accordance with claim 1 in which the promoter is a zinc compound.

4. A method in accordance with claim 3 in which the promoter is zinc chloride.

5. A method in accordance with claim 4 in which the zero valent nickel complex is tetrakis(tri-p-tolylphosphite)nickel.

6. A method in accordance with claim 1 in which the reaction is carried out in the presence of a solvent comprising a mono- or dihydroxy ring-substituted aryl compound.

7. A method in accordance with claim 1 in which 1,3-dicyanocyclopentane is separated from the reaction product by fractional distillation.

8. A method of converting cyclopentadiene to a product mixture comprising 1,2-dicyanocyclopentane and 1,3-dicyanocyclopentane which is predominant in 1,3-dicyanocyclopentane comprising the steps
    (a) contacting cyclopentadiene with hydrogen cyanide at a temperature from about −25° C. to about 200° C. in the presence of a zero valent nickel complex, free of CO, at a molar ratio of cyclopentadiene to said nickel complex of about 10:1 to about 2000:1, said nickel complex having the formula $Ni(A^1)(A^2)(A^3)(A^4)$ where $A^1$, $A^2$, $A^3$ and $A^4$ are neutral ligands which may be the same or different and have the formula P (X) (Y) (Z) wherein X and Y are selected from the class consisting of R and OR, and Z has the formula OR, wherein the three R's may be the same or different and wherein R is selected from the class consisting of alkyl and aryl groups containing up to 18 carbon atoms, whereby the cyclopentadiene is monohydrocyanated to a mixture comprising about two percent 1-cyanocyclopentene, about 82 percent 2-cyanocyclopentene and about 16 percent 3-cyanocyclopentene; and
    (b) contacting said monohydrocyanated reaction product with hydrogen cyanide at a temperature from about −25° C. to about 200° C. in the presence of said zero valent nickel complex and a promoting amount of a compound containing a metal selected from the group consisting of zinc, cadmium, beryllium, aluminum, gallium, indium, silver, titanium, zirconium, hafnium, germanium, tin, vanadium, niobium, scandium, chromium, molybdenum, tungsten, manganese, rhenium, palladium, thorium, erbium, iron and cobalt; wherein
        (1) the molar ratio of said promoter to the nickel complex is from about 1:16 to about 50:1; and
        (2) the molar ratio of the monohydrocyanated reaction product to the nickel complex is from about 10:1 to about 2000:1.

9. The compound 1,3-dicyanocyclopentane.